J. H. OSBORNE.
MEAT SLICING MACHINE.
APPLICATION FILED MAY 7, 1920.
1,366,927.
Patented Feb. 1, 1921.
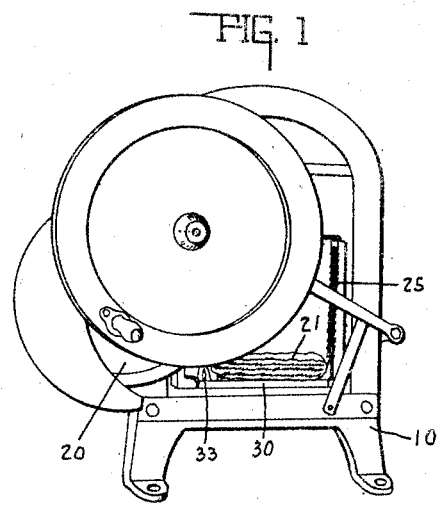
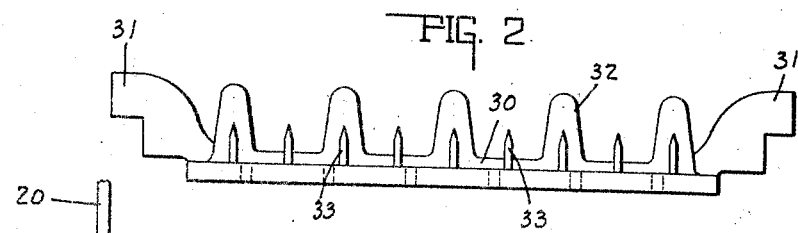
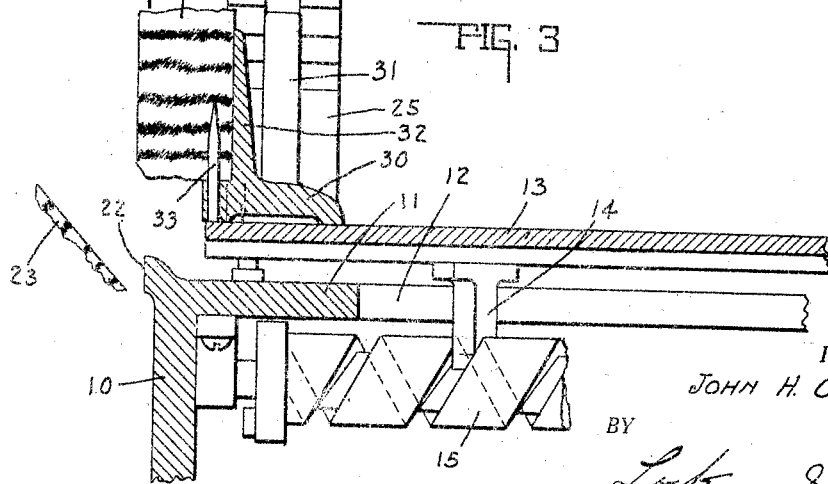
INVENTOR.
JOHN H. OSBORNE.
BY
Lockwood Lockwood
ATTORNEYS.

UNITED STATES PATENT OFFICE.

JOHN H. OSBORNE, OF ANDERSON, INDIANA.

MEAT-SLICING MACHINE.

1,366,927. Specification of Letters Patent. Patented Feb. 1, 1921.

Application filed May 7, 1920. Serial No. 379,523.

*To all whom it may concern:*

Be it known that I, JOHN H. OSBORNE, a citizen of the United States, and a resident of Anderson, county of Madison, and State of Indiana, have invented a certain new and useful Meat-Slicing Machine; and I do hereby declare that the following is a full, clear, and exact description thereof, reference being had to the accompanying drawings, in which like numerals refer to like parts.

The object of this invention is to improve the construction of meat slicers and like machines so as to enable the remnant of meat or other article to be sliced. In such machines heretofore in use, so far as I am aware, when the side of bacon or other piece of meat or article has been sliced as far as the machine will slice the same, there is a remnant of considerable thickness which cannot be sliced by the machine and which is, therefore, often a loss. This invention is to remedy that difficulty and avoid that loss.

The chief feature of the invention consists in providing for the machine a readily replaceable remnant holder which will enable the remnant to be reversed and sliced further to a minimum.

The full nature of the invention will be understood from the accompanying drawings and the following description and claims:

In the drawings, Figure 1 is an end elevation of a meat slicing machine equipped with said invention. Fig. 2 is an end elevation of the remnant holder. Fig. 3 is a central vertical section through a portion of the machine with the remnant of meat therein, to illustrate the manner of use of said invention, parts being broken away.

In meat slicing machines heretofore made there has been provided a frame 10 having a top 11 with a longitudinal slot 12. Upon said top there is a meat plate or carriage 13 which is movable longitudinally of the machine by means of a lug 14 extending down therefrom through the slot 12 in the top of the frame into engagement with the screw 15 mounted within the frame and provided with suitable means for rotating the same, whereby when said screw is rotated, it will move the meat holder longitudinally of the machine so as to feed the meat intermittently, step by step, to the knife.

There is shown a rotary knife 20 provided with means for simultaneously rotating the same and causing it to travel across the path of the meat 21 and in line with the sharpening edge 22 of the frame 10. As the machine is operated, it slices the meat and the slices 23 fall into a pan or holder, not shown.

For holding the meat down tight on the meat plate there is secured to the meat plate on each side a bar 25 centrally and vertically slotted so it has a pair of vertical racks, one on each side of said slot. A bar, not here shown, is provided in these machines for resting upon the piece of meat with its ends resting in the slots of said bars 25 and having at each end a spring-actuated pawl adapted to engage the rack, so that when said bar is forced downward, it will be held downward by the racks. All of the foregoing mechanism is old in meat slicers heretofore manufactured and used. In using said machines, as stated above, the meat is fed to the knife or cutter step by step until the feeding mechanism has reached its limit of movement, but that leaves a remnant of the meat uncut and heretofore said remnant has been often thrown away or lost because it cannot be sliced by the machine and must be sliced by hand, instead of by the machine.

The invention herein consists in combining with such machine or any other form of meat cutter heretofore known, a bar 30 adapted to extend transversely of and rest upon the meat plate 13 with its ends 31 projecting loosely in the slots between the pairs of rack bars 25. After the meat has been sliced as heretofore, the bar for holding down the meat, heretofore described and not shown, is removed. The bar 31 is then put in its place with its ends loosely inserted in the guide slots as shown, and the remnant of unsliced meat 21 is mounted on said bar.

For the purpose of mounting and holding the remnant of meat on the bar 30, it is provided with an upwardly extending stop member or finger 32 having four vertical, plain outer faces in alinement with each other transversely of the machine. Near the vertical faces of said fingers 32 there are pins 33 mounted in the bar 30 and extending upward for a portion of the height of the fingers 32, as shown, and as close to the faces of said fingers as possible, but so that, when the remnant of meat 21 is placed thereon and against said fingers 32, said remnant of meat will be held firmly in position.

This means for mounting the remnant of meat presents the major portion of the same outward and to the cutter or knife 20. The machine is then operated as before as far as it can be operated and the meat will be sliced until the remnant holder comes up to the cutter 20. That will enable the knife to slice the meat practically up to the pins 33 and it will leave a narrow slice between the pins 33 and the face of the fingers 32, so that the remnant of meat is practically entirely sliced.

After the remnant of meat has been thus sliced, the remnant holding bar 30 is lifted out of place and another large piece of meat is placed on the plate 13 and means for holding the meat down is inserted between the rack bars 25, as has been the practice previous to this invention.

This invention is not limited to this particular construction of meat slicing machines or to meat slicers, as it may be used in connection with machines for slicing other articles.

The invention claimed is:

1. The combination with the knife and article feed carriage in a slicing machine, and a vertically slotted guide secured to and extending upward from each side of the carriage near the end thereof next to the knife, of means for holding the remnant of meat or other article consisting of a bar upon said carriage with its ends entering said guide slots so as to be guided thereby, a stop member extending upwardly from said bar and in alinement transversely of the carriage, and pins extending upwardly from said bar near said stop member and between the stop member and the knife.

2. The combination with the knife and article feed carriage in a slicing machine, of means for holding the article to be sliced, said means comprising a bar extending transversely of and carried by the feed carriage, a plurality of fingers extending upwardly from the bar in spaced relation with each other and in transverse alinement with respect to said carriage, and a series of pins extending upwardly from said bar and positioned relatively close to said fingers and in registration with the same, and a plurality of other upwardly extending pins upon said bar and in alinement with said first mentioned pin and in registration with the spaces between said fingers whereby the remnant of meat or other article will be rigidly secured in position upon the bar for slicing the remnant.

In witness whereof, I have hereunto affixed my signature.

JOHN H. OSBORNE.